United States Patent [19]
Boonstra et al.

[11] 3,912,713
[45] Oct. 14, 1975

[54] GUAR GUM DERIVATIVES AND PROCESS FOR PREPARATION

[75] Inventors: Douwe Johannes Boonstra, Veendam; Age Bakker, Haren, both of Netherlands

[73] Assignee: Scholten-Honig Research B.V., Netherlands

[22] Filed: Nov. 12, 1973

[21] Appl. No.: 414,844

Related U.S. Application Data

[63] Continuation-in-part of Ser. No. 392,470, Aug. 29, 1973, abandoned.

[52] U.S. Cl. ........... 260/209 R; 106/205; 260/234 R
[51] Int. Cl.$^2$ ......................................... C08B 37/00
[58] Field of Search ............................... 260/209 R

[56] References Cited
UNITED STATES PATENTS

| | | | |
|---|---|---|---|
| 3,300,473 | 1/1967 | Christoffel et al. | 260/209 R |
| 3,314,936 | 4/1967 | Ames et al. | 260/209 R |
| 3,326,890 | 6/1967 | Engelskirchen et al. | 260/209 R |
| 3,349,077 | 10/1967 | Schweiger | 260/209 R |
| 3,350,386 | 10/1967 | Engelskirchen et al. | 260/209 R |
| 3,455,899 | 7/1969 | Keen | 260/209 R |
| 3,459,733 | 8/1969 | Byrd, Jr. et al. | 260/234 R |
| 3,547,828 | 12/1970 | Mansfield et al. | 260/209 R |
| 3,597,417 | 8/1971 | Myhre | 260/234 R |

Primary Examiner—Johnnie R. Brown
Attorney, Agent, or Firm—Wenderoth, Lind & Ponack

[57] ABSTRACT

Non-lumping derivatives of guar gum are produced by derivatizing a method for producing non-lumping derivatives of guar gum, which comprises derivatizing guar gum in the form of guar gum splits at a moisture content of 20–80% by weight, while maintaining the form of gum splits, raising the moisture content of the splits, if required, to 30–80% by weight and fragmenting the splits by pressing them out in a thin layer and drying them on a cylinder heated to 100°–180°C and comminuting the film so formed to flakes of a size in the order of + 20 mesh.

7 Claims, No Drawings

GUAR GUM DERIVATIVES AND PROCESS FOR PREPARATION

This is a continuation-in-part of Ser. No. 392,470, filed Aug. 29, 1973, and now abandoned.

This invention relates to a method for the preparation of novel non-lumping guar gum derivatives and to derivatives obtained by this method.

It is known that dry finely powdered guar gum and derivatives thereof have a strong tendency to form lumps or clots on mixing with water. Very rapid and intense agitation and/or long heating are required to dissolve these lumps or clots. It is often impossible to obtain a homogeneous solution. In order to prevent the tendency to form lumps of clots, in the prior art these finely powdered guar gum products have been brought into the form of agglomerates of finely divided particles. Generally the processes for obtaining these agglomerates consist of moistening guar gum products with a swelling agent or solvent simultaneously with mechanical agitation. Several embodiments of this process have been described in the patent literature. However, because of the very high swelling powder of guar gum, these embodiments are cumbersome or unsuitable for obtaining agglomerates of finely divided guar gum particles. U.S. Pat. No. 2,662,882, for instance, describes the preparation of agglomerates of guar gum by mixing guar gum flour with 50% of water to a homogeneous mass, which is ground in a hammermill to a specific mesh size and dried. During this procedure the guar gum turns into a rubbery mass, which is difficult to process. Besides, the known processes for obtaining finely powdered guar gum derivatives, are laborious and consist of several steps. In these processes guar gum endosperm (guar gum splits) is milled to give guar gum flour. Due to the toughness of the splits this takes a considerable amount of energy and time. The guar gum flour may then be derivatized in aqueous dispersion which is a cumbersome step because of the tendency of guar gum to become sticky or to form a mass of rubbery consistency. After the derivatization step the guar gum derivative may be recovered by the expensive procedure of precipitating with a water miscible solvent, e.g. methanol, followed by drying.

In more recent procedures the guar gum flour is etherified in the form of a dry powder, care being taken that not too much water is added, which would result in the formation of a viscous dough. After the reaction the product is dried and ground.

It is an object of the present invention to produce guar gum derivatives which do not form lumps or clots on mixing with water or aqueous solvents by a simpler and more economic process.

It has now been found that it is possible to obtain in a very efficient manner derivatives of guar gum in the form of non-lumping flakes by derivatizing guar gum in the form of guar gum splits in the presence of a specific amount of moisture and thereafter fragmenting the splits by treating them in a relatively thin layer on a heated drum.

This new process eliminates the steps of milling guar gum endosperm to flour before the derivatizing step, and the steps of working up the reaction mass after the derivatizing step.

The term "guar gum splits" means the guar gum endosperm which is obtained by removal of the hull and the germ from the guar seeds.

The present invention accordingly provides a method of producing non-lumping derivatives of guar gum, which comprises derivatizing guar gum in the form of guar gum splits at a moisture content of 20–80% by weight, while maintaining the form of gum splits, raising the moisture content of the splits, if required, to 30–80% by weight and fragmenting the splits by pressing them out in a thin layer and drying them on a cylinder heated to 100°–180°C and comminuting the film so formed to flakes of a size in the order of + 20 mesh.

In carrying out the method of the invention any guar gum derivative can be made, provided the form of the gum splits is maintained during the derivatization. The new process differs in this respect from known processes, in which the gum splits are ruptured, e.g., as described in U.S. Pat. No. 2,496,670.

Guar gum splits, as obtained after the removal of the hull and the germ from guar seeds, are employed as starting material. The polysaccharide in the gum splits may have undergone some degradation as result of the pretreatment used for the removal of the hulls, i.e., a dry heat treatment or a treatment with acid, alkali or oxidizing agents.

Suitable derivatizing agents are mono- and polyfunctional etherifying agents, such as compounds containing reactive halogen (e.g. alkylhalides, halogen fatty acids, dihaloalkylethers, halohydrins (such as glycerol dihalodrins), haloalkylsulphonic acids, haloalkylamino compounds (such as 3-chloro-2-hydroxypropyltrimethylammoniumhydrochloride, diethylaminoethylchloride), compounds containing reactive epoxy groups (e.g., alkylene oxides (such as glycidol, 2,3-epoxypropyl-N,N-dialkylamine), epoxyhalohydrins (such as epichlorohydrin), compounds containing a reactive unsaturated bond (e.g., ethylene sulphonic acid, acrylonitrile, acrylamide), alkylsulphates, sultones, diazomethane, ehtylene imine, methylourea, methylolmelamines, phenol formaldehyde precondensates and resorcinol formaldehyde precondensates; mono- and polyfunctional esterifying agents such as anhydrides of mono- or polyacids, organic and inorganic acid chlorides, lactones, vinylesters of carboxylic acids, ketenes, mono- or diisocyanates, complexes of sulfur trioxide with tertiary amines or dimethylformamide; acetalizing agents such as aldehydes and ketones (e.g., formaldehyde, glyoxal, butyraldehydes) or products capable of splitting off aldehydes (e.g., paraformaldehyde, hexamethylene tetramine).

The derivatisation, during which the gum splits must stay intact, can be carried out by mixing the guar gum splits, a specific amount of water and, asually, some alkali. The mixing of these components is far easier in this case than when guar gum flour is used as raw material. Thereafter the derivatizing agent is added to the swollen, particulate gum splits and the reaction is allowed to proceed.

The start up of the reaction may be increased by a gradual warming up of the mixture. The moisture content of the guar gum splits should at least be about 20% by weight in order to effect a homogeneous derivatization. At a moisture content of about 80% by weight or above the gum splits are easily ruptured which results in the formation of a rubbery mass, which cannot easily be handled and cannot be passed between heated rolls. Only when handling is very careful the guar gum splits can be derivatized at a moisture content above about 80% by weight. Otherwise the gum splits become sticky and are ruptured to a rubbery mass. However, said handling is laborious and not economic. Generally this derivatization may be performed in various types of mixing apparatus such as in containers provided with agigators or in rotating chambers. In order to obtain the required fragmentation the derivatized guar gum splits should at least have a moisture content of about 30% by weight. Below said percentage the gum splits are too hard to be fragmented between heated rolls. A moisture content of about 80 % by weight is the upper limit for fragmentation between heated rolls. Above this percentage the gum splits are too easily ruptured for good handling and the removal of the moisture by a heated drum becomes less economic. Thus the derivatized gum splits, with a moisture content of 30 to 80% by weight, are treated between heated rolls or drums by feeding them to a drum dryer, where they are passed in a thin layer and dried at a temperature between about 100°C and 180°C. Several types of drum dryers may be used in carrying out the method of the invention, such as a single drum dryer with top feed by one or more applicator rolls or a double drum dryer with valley feed (see: Whistler/Paschall: Starch: Chemistry and Industry Vol II (1967) p. 524–528). The resultant dry film coming from the drum dryers is reduced to flakes which substantially are larger than 20 mesh and preferably have a size of 2–5 mm.

It is a preferred embodiment of the method according to the invention to derivatize guar gum splits at a moisture content of 40–80% by weight, and to pass them over the heated drum dryer without further adjusting of the moisture content. Superior results are obtained when the moisture content is 50–70% by weight.

It is further within the scope of the invention to prepare mixed derivatized guar gum splits, containing different substituent groups.

The guar gum derivatives obtained according to the method of the invention do not form lumps or clots on mixing with water. No special stirring equipment is needed to disperse the new guar gum derivatives in water. The stable viscous and clear solutions so obtained possess good film-forming properties and pass fine screens e.g., Terital polyester screens with an aperture of 60–180 micron without blocking.

The derivatives of guar gum obtained by the method of the invention may be used as thickening agents in general. They are especially useful as thickening agents for textile printing pastes. Other applications are the use as dressing, sizing and finishing agents, protective colloids and as agents for stabilizing dispersions and emulsions.

The invention will be further elucidated with reference to the following examples.

EXAMPLE I 100 parts by weight of guar gum splits (moisture content 8% by weight); 127,5 parts by weight of water, 20.9 parts by weight of sodium hydroxide solution (7.5 N) and 12.4 parts by weight of sodium monochloroacetate are mixed in a mixer with low shear during 60 minutes and with gradual heating to 60°C. The moisture content of the guar gum splits is 62% by weight. Then the mixture is allowed to react for 60 minutes. After the reaction the mixture is passed over a heated drum drier with pressurized applicator rolls at 150°C. The dry film so obtained is comminuted in a hammer mill to flakes of a size of 3–5 millimeters.

The product has a degree of substitution of carboxymethyl groups of 0.12. It can be dispersed in water by manual stirring to give a solution without lumping.

EXAMPLE II 100 parts by weight of guar gum splits (moisture content 8% by weight), 140 parts by weight of water, 12.6 parts by weight of sodium hydroxide solution (7.5 N) are mixed in an autoclave provided with a stirrer. The resulting moisture content of the splits is 62% by weight.

The splits are allowed to swell for 60 minutes with gradual heating to 65°C. Then 4.4 parts by weight of ethylene oxide are slowly added in 60 minutes, while the temperature is maintained at 70°C.

After a further 60 minutes of reaction, the reaction mixture is neutralized with 10 parts by weight of sulfuric acid (10 N) and passed over a heated double drum drier at 130°C. The film so obtained is reduced to flakes of 2–4 millimeters in a hammer mill. The degree of substitution of hydroxyethyl groups is 0.14.

The product does not form lumps or clots on stirring with water.

EXAMPLE III 100 parts by weight of guar gum splits (moisture content 8% by weight), 30 parts by weight of water, 6.5 parts by weight of sodium carbonate solution (23% by weight) are mixed in a mixer with low shear for 60 minutes, the moisture content of the splits being 32% by weight. After the addition of 5.0 parts by weight of vinyl acetate, the mixture is allowed to react for 60 minutes at 25°–30°C.

Then the mixture is neutralized and the moisture content of the splits is raised to 76% by weight by mixing with 7.0 parts by weight of acetic acid (2 N) and 240 parts by weight of water. The mixture is passed over a heated drum at 120°C. The film so obtained is reduced to flakes of larger than 20 mesh in a hammer mill. The degree of substitution of acetyl groups is 0.08. The product gives a clear solution having no lumps or clots on stirring with water.

EXAMPLE IV 100 parts by weight of guar gum splits (moisture content 8% by weight), 30 parts by weight of water, 6.5 parts by weight of sodium carbonate solution (23% by weight) are mixed in a mixer with low shear for 60 minutes, the moisture content of the splits being 32% by weight. After the addition of 5.0 parts by weight of vinylacetate, the mixture is allowed to react for 60 minutes at 25°–30°C.

Thereupon 4.4 parts by weight of ethylene oxide are added, while the temperature is being raised to 60°C. The mixture is allowed to react for 60 minutes and is then neutralized with 7.0 parts by weight of acetic acid (2 N), the moisture content being approximately 34% by weight. The splits are fragmented by feeding them in the nip of a double drum drier with 0.2 mm clearance between the drums, and a drum temperature of 150°C. The comminuted product, consisting of flakes of 2–4 mm. dissolves in water without lumping.

It is also possible to perform the esterification with vinyl acetate and the etherification with ethylene oxide simultaneously.

We claim:

1. In a method for producing derivatives of guar gum wherein guar gum is reacted with a monofunctional or polyfunctional etherifying agent or esterifying agent, the improvement which comprises employing the guar gum in the form of splits at a moisture content of 20-80% by weight, while maintaining the form of gum splits throughout the reaction, adjusting the moisture content of the thus obtained reacted splits to 30 to 80% by weight and fragmenting them by pressing them out in a thin layer and drying them on a cylinder heated to 100°-180°C to form a film, and comminuting said film to flakes of a size in the order of + 20 mesh.

2. A method according to claim 1, in which the guar gum splits are derivatized and thereafter fragmented at a moisture content of 40-80% by weight.

3. A method according to claim 1, in which the guar gum splits are derivatized with two agents selected from the group consisting of etherification agents and esterification agents.

4. A method according to claim 3, in which the guar gum splits are derivatized by reacting them simultaneously with two of said agents.

5. A method according to claim 3, in which the guar gum splits are derivatized by reacting them successively with two of said agents.

6. A method according to claim 1, wherein said agent is sodium monochloroacetate, ethylene oxide or vinyl acetate.

7. The product of the process of claim 6.

* * * * *